W. EBBITT.
Car-Axle Box.
No. 34,674.
Patented Mar. 18, 1862.
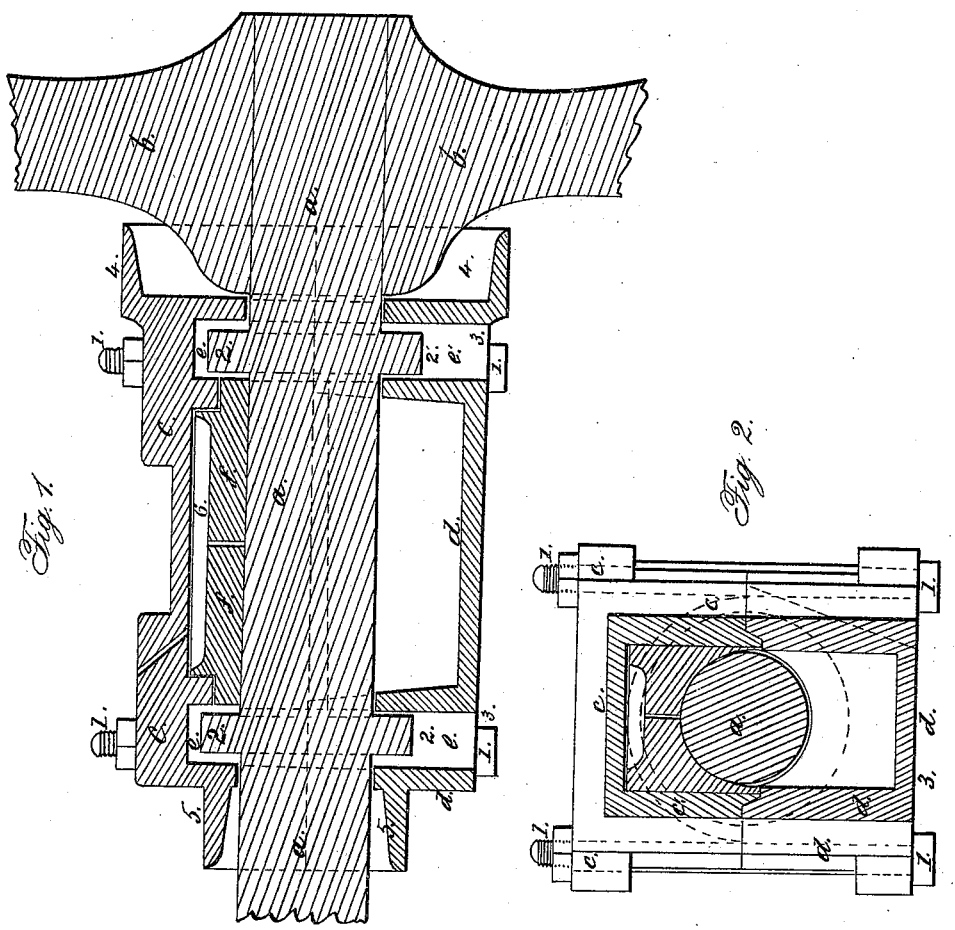

UNITED STATES PATENT OFFICE.

WILLIAM EBBITT, OF NEW YORK, N. Y.

IMPROVEMENT IN BOXES FOR CAR-AXLES.

Specification forming part of Letters Patent No. 34,674, dated March 18, 1862.

*To all whom it may concern:*

Be it known that I, WILLIAM EBBITT, of the city and State of New York, have invented, made, and applied to use a certain new and useful Improvement in Boxes for Railroad-Car Axles; and I do hereby declare that the following is a full, clear, and exact description of the construction and operation of the same, reference being had to the annexed drawings, making part of this specification, wherein—

Figure 1 is a vertical longitudinal section, and Fig. 2 is a cross-section of my axle-box.

Similar letters of reference denote the same parts.

Several axles have heretofore been constructed for carriages wherein the hub of the wheel has been confined by a collar on the axle, and in other instances a loose collar or packing-ring has been employed to intercept the dust and dirt.

The nature of my said invention consists in the employment of a metallic collar permanently fixed or formed on the axle and taking against the end of the bearing to prevent end motion and contained within a metallic chamber in the axle-box, which chamber is open at the bottom, whereby this collar also becomes a centrifugal dust and dirt excluder.

In the drawings I have represented my invention as applied to an axle with the bearings between the wheels; hence two of the centrifugal dust-excluding collars are applied to each box, because the axle goes through the box, but only one is required to a bearing outside of the wheels. The bearing for the journal I form of chilled iron, for I have discovered that a bearing of chilled iron does not wear out the journals faster than the usual composition, and that it will wear two or three times as long as the said composition bearings, and that there is no perceptible increase of friction when properly lubricated. This chilled-iron bearing takes the aforesaid collar, and not being so liable to wear prevents the increase of end play and the concussion consequent thereon that is now experienced.

In the drawings, $a$ is the axle.

$b$ is a representation of a part of the wheel-hub.

$c$ is the upper and $d$ the lower half of the axle-box.

1 1 are the bolts by which the box is attached together, and the said box is to be fitted within any usual pedestal or other support on the car.

2 2 are the metallic collars welded or otherwise formed permanently upon the axle $a$, and $e\ e$ are the chambers formed in the box $c\ d$ for the reception of these collars 2 2. There is sufficient space for these collars 2 2 to revolve freely and form centrifugal dust or dirt excluders, to throw off foreign substances that might otherwise work into the bearing, and these substances fall away through the openings 3 3 at the bottom of the chamber, so that the bearing is kept clean.

4 is a ring-flange keeping mud or dirt at one end of the journal from falling upon the axle from the wheels, and the ring-flange 5 at the other end effects a similar operation.

$f$ is the bearing for the journal or axle $a$. This is formed of cast-iron chilled at the ends and in the cavity for the axle $a$. Thereby the entire wear of the axle and collars is against the chill-hardened surface, and this practically is found to be far more durable than the composition-boxes heretofore employed, and the journal itself is not worn thereby more than would be the case if a composition-box were employed.

A cavity may be provided, as at 6, or the oil supplied to the journal in any other suitable manner.

What I claim, and desire to secure by Letters Patent, is—

1. The employment of the chilled-iron bearing $f$ for the axle $a$ fitted and acting substantially as and for the purposes specified.

2. The metallic collar 2, permanently formed on or attached to the axle $a$ when inclosed within the chamber $e$, that has an opening at the bottom, said collar forming a centrifugal dust and dirt excluder, as and for the purposes set forth.

In witness whereof I have hereunto set my signature this 7th day of December, 1861.

WM. EBBITT.

Witnesses:
LEMUEL W. SERRELL,
JAMES H. HAROLD.